United States Patent [19]
Allera et al.

[11] 3,946,224
[45] Mar. 23, 1976

[54] METHOD AND DEVICE FOR DETECTING THE PASSAGE OF OBJECTS

[75] Inventors: Jean-Louis Allera, Moisans; Jacques Bergeri; Paul Perroud, both of Meylan; Gaëtan Pleyber, Domene; Jean-Louis Violet, Seyssinet-Pariset, all of France

[73] Assignee: Commissariat A l'Energie Atomique, Paris, France

[22] Filed: Oct. 1, 1974

[21] Appl. No.: 510,973

[30] Foreign Application Priority Data
Oct. 8, 1973 France .............................. 73.35881

[52] U.S. Cl. ............. 250/221; 250/214 R; 250/239; 356/28
[51] Int. Cl.² ......................................... G01D 21/04
[58] Field of Search ........... 250/221, 222, 223, 239, 250/206, 214 R, 216; 356/28

[56] References Cited
UNITED STATES PATENTS

| | | | |
|---|---|---|---|
| 2,912,593 | 11/1959 | Deuth | 250/239 X |
| 3,444,384 | 5/1969 | Horeczky | 250/221 |
| 3,631,434 | 12/1971 | Schwartz | 250/221 X |

Primary Examiner—Alfred E. Smith
Assistant Examiner—E. R. LaRoche
Attorney, Agent, or Firm—Sughrue, Rothwell, Mion, Zinn and Macpeak

[57] ABSTRACT

The method consists in causing objects to pass in front of a background having a distinctly different brightness, in aligning a collimator by means of a sighting telescope in a direction of observation such that the path of the objects intersects a line defining the direction of observation of the collimator, in eliminating light from all directions other than the direction of observation, in detecting the variation of light intensity corresponding to the passage of the object by means of an electrical signal which is delivered by a photoreceiver and is a function of the luminous flux picked up by the photo-receiver and in differentiating the signal with respect to time by means of an electronic circuit so as to obtain an output signal which is a function of the variations of luminous flux on the photoreceiver.

13 Claims, 4 Drawing Figures

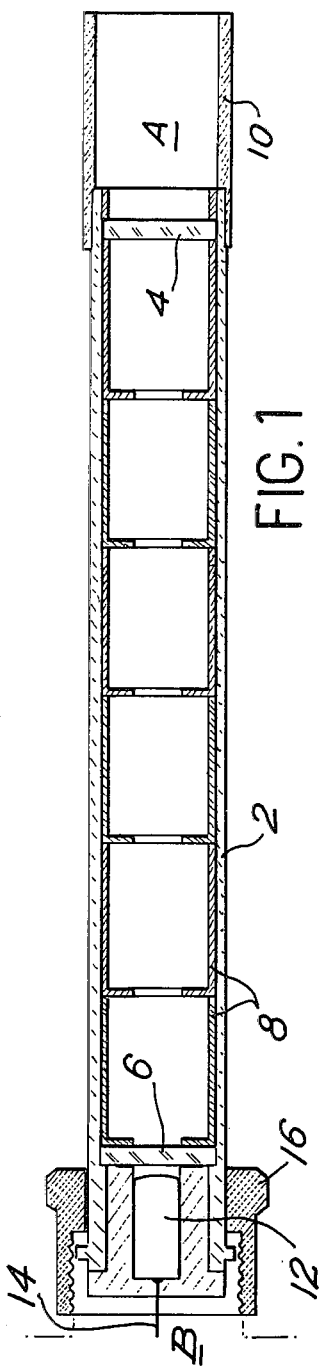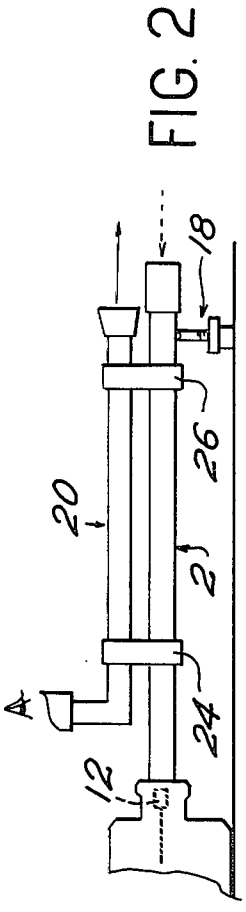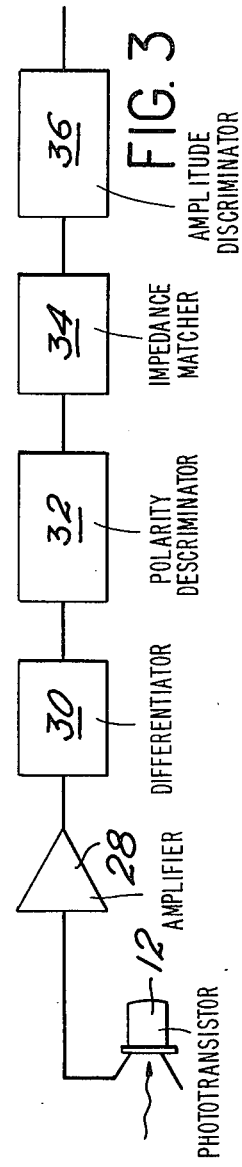

METHOD AND DEVICE FOR DETECTING THE PASSAGE OF OBJECTS

This invention relates to a method for detecting the passage of objects across a predetermined line and to a device for carrying out said method.

The invention is also concerned with a method and a device for counting objects and for measuring the speed of passage of said objects.

It is often useful to detect the passage of an object across a predetermined line for the purpose of synchronizing an operation with respect to the instant of passage of said object, to count the number of objects which pass across said line, or to measure the speed of the detected object.

As is already known in the prior art, devices employed for the purposes just mentioned detect the passage of an object across a line by interrupting a light beam which travels from a light source to a photosensitive receiver. The light source can be a simple lamp or, in more precise applications, a continuous-emission laser. In the case of outside use, the independence of operation of these systems is governed by the power consumption of the light source and this affects the convenience of use of such systems. For example, provision must be made for a power of 30 watts by means of a 12-volt supply in order to obtain a range of 50 meters (distance between the light emitter and the light receiver). The devices which make use of lasers are very accurate but costly and also entail the need for a cumbersome supply system which is not conducive to easy transportation of the equipment.

Furthermore, provision is not usually made for any special device which takes the speed of passage of the object into account.

The present invention relates to a method for detecting the passage of objects which dispenses with the need for auxiliary lighting during daytime use.

In more precise terms, the method in accordance with the invention essentially consists in causing said objects to pass in front of a background whose brightness is distinctly different from that of the objects, in aligning a collimator by means of a sighting telescope for example in a direction of observation such that the path of the objects intersects a line defining the direction of observation of the collimator, in eliminating the light which comes from directions other than the direction of observation, in detecting the variation of light intensity corresponding to the passage of the object by means of an electrical signal which is delivered by a photoreceiver and is a function of the luminous flux picked up by said photoreceiver and in differentiating said electrical signal with respect to time by means of an electronic circuit so that there is consequently obtained an output signal which is a function of the variations of said luminous flux on the photoreceiver.

The presence of a collimator in front of the photodetector permits reception of the light derived from the line defined by the selected direction of observation. The passage of the object is then detected as a result of the abrupt variation of light (increase or decrease) received by the photodetector. It is possible by design to make a choice between an increase in light on the photodetector and a decrease in light; it may also be found necessary to detect either the passage of a bright object against a background having a low level of illumination or the passage of a dark object against a bright background; depending on the combination of these two factors, either the front or the rear of the object will accordingly be detected.

In order to prevent the detection of the light derived from objects other than those whose passage is to be detected, the unwanted light which comes from directions other than the direction of observation is eliminated by means of diaphragms and absorbent coatings within the interior of the collimator.

Depending on the sighting accuracy which it is desired to obtain, the characteristics of the photoreceiver and in particular the sensitivity of this latter, the speed of the object whose passage is to be detected and the contrast of the object with respect to the background, it is possible to limit to a greater or lesser extent the solid angle corresponding to the field of view of the photoreceiver. As greater accuracy of detection is required, so the solid angle just mentioned must be of smaller value.

The light receiver delivers a signal which is a function of the luminous flux picked up by this latter and since the variations of luminous flux correspond to a passage of the object, the output signal of the receiver is differentiated in order to obtain essentially two peaks at each passage of an object; one peak corresponds to the case of a bright object against a dark background to a positive peak which precedes a negative peak and is related to the variation of intensity corresponding to the appearance of the luminous object against a dark background which gives rise to an increase in the light intensity received by the receiver; the second peak corresponds to a reduction in the light intensity and therefore to the disappearance of the object.

In a preferential mode of application of the method according to the invention, only the variations of luminous flux of a given sign are detected by placing a polarity discriminator in the electronic circuit.

Thus, after discrimination and differentiation of the signal delivered by the photoreceiver, one peak alone corresponds to the passage of an object; the amplitude of this peak is a function of the speed of passage of the object in front of the photoreceiver (the amplitude will be proportional for example to the speed of passage of the object).

An alternative embodiment of the invention consists in detecting the differentiated signals corresponding to the variations of light intensity within a preselected range of amplitude by placing an amplitude discriminator in the electronic circuit. Said amplitude discriminator makes it possible to have at the output only signals which correspond to speeds of passage of objects within a range of predetermined velocities; this alternative embodiment makes it possible to eliminate the signals corresponding to variations which are either slower or faster than the passage of the objects to be detected and accordingly permits a better transfer of information by increasing the signal-to-noise ratio.

In another alternative embodiment of the invention, the light rays derived from the collimator are caused to converge on the sensitive entrance face of the photoreceiver by means of a lens, for example. It is thus possible to employ a collimator having a large diameter in the case of an environment which has a low level of illumination and to collect on the photoreceiver only the signal which corresponds to the passage of the object.

The invention also makes provision for a device which serves to carry out the method and which comprises:
- a collimator formed of a cylindrical tube which is closed at each end by a transparent window and the external wall of which is non-reflecting;
- a plurality of absorbent diaphragms disposed in alignment within the interior of the collimator;
- a light receiver located at one end of the exit B of the collimator;
- electronic means for differentiating, amplifying and discriminating the electrical signal at the output of the receiver, depending on the polarity.

The device preferably comprises in addition either a sighting telescope which is parallel to the axis of the cylinder or a sun-masking device fixed at the extremity A of the collimator, or both of these latter.

The collimator is fitted with a non-reflecting wall and with a set of aligned non-reflecting diaphragms which permit observation in a given direction and eliminate unwanted light. The collimator can be made leak-tight across the two windows in order to prevent any condensation of steam and to prevent the introduction of dust particles which diffuse the light and reduce the sensitivity of the apparatus. The problem of condensation of steam is particularly important if the apparatus is employed in damp locations since the appearance of water droplets on the photoreceiver or even within the interior of the apparatus results in diffusion of unwanted light which is detrimental to the good performance of the apparatus.

The photoreceiver can be either a phototransistor, a photodiode, a photomultiplier or any light-intensifying system.

The windows, the lens and the photoreceivers can be adapted to operate in the infrared range; this entails the need to ensure that the windows and the lens which may be provided are chosen in such a manner as to be transparent to wavelengths exceeding one micron (and made of germanium, for example).

In another alternative embodiment of the invention, a lens is placed in proximity to the rear face of the collimator in order to focus the light onto the photoreceiver; said lens may constitute the exit window of the collimator if so required.

In accordance with the invention, the electronic means whereby the signal delivered by the photoreceiver is differentiated with respect to time, amplified and discriminated consist of a preamplifier, a differentiating circuit, a polarity-discriminating circuit and an impedance matching circuit, these different elements being disposed in series in the order which has just been given. These circuits are of known type and one example of application which is described hereinafter will serve to gain a better understanding of the operation of the electronic chain.

In an alternative embodiment of the invention in which it is desired to observe the passage of objects only within a predetermined speed range, the electronic circuit comprises at the end of the chain an amplitude discriminator which permits the transmission only of signals which are within a given range of amplitude.

In accordance with the invention, the diaphragms and the internal wall of the collimator tube are made of metal on which a mat black coating has been deposited. In consequence, the unwanted light which is admitted into the collimator and is located outside the preferential direction of observation is absorbed by the walls and does not reach the photoreceiver.

It is readily apparent that the material constituting the diaphragms and the wall can also be of absorbent plastic material or made of a metal to which a surface treatment has been applied; special care must be taken to prevent the rays which impinge unpon the collimator walls at a large angle of incidence from being directed towards the photoreceiver: reflections which have a large angle of incidence are dangerous since the greater part of the light is reflected and it is for this reason that a succession of diaphragms is introduced so that, if the angle of incidence on the wall is large, the complementary angle of the wall located at right angles to the diaphragm is small; thus the unwanted light is reflected only to a small extent and is therefore absorbed.

In accordance with an alternative embodiment of the present invention, there is placed at the output of the electronic chain a counting unit for delivering a signal which is proportional to the number of peaks corresponding to the number of objects detected.

This alternative embodiment is particularly advantageous when it is desired to count a large number of identical objects without incorporating with the electronic circuit a unit for recording the different peaks.

Further properties and advantages of the invention will become more readily apparent from the following description of exemplified embodiments which are given by way of explanation without any limitation being implied, reference being made to the accompanying drawings, in which:

FIG. 1 is a diagram of the collimator;

FIG. 2 is a diagram of the sighting telescope and shows the method adopted for fixing this latter on the collimator;

FIG. 3 is a block diagram of the electronic circuit which is associated with the photodetector;

Figure 4:
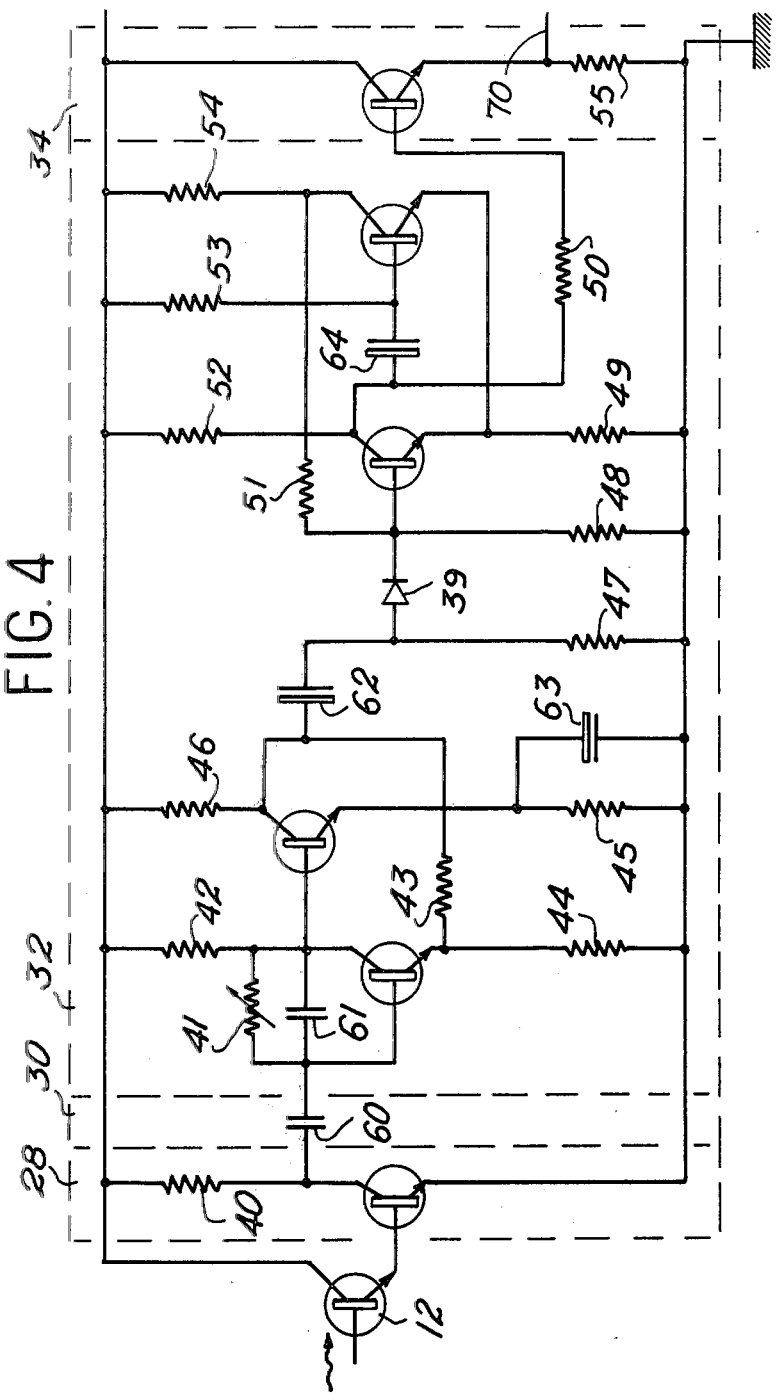
FIG. 4 shows one example of electronic construction of the circuit.

As has already been mentioned, the invention consists in detecting the passage of objects by aligning a collimator in a direction of observation which intersects the line of passage of said objects; a measuring chain processes the signal delivered by the photoreceiver according to the measurement which it is desired to perform on the object: synchronization of an auxiliary apparatus, measurement of the speed of the object, counting of the number of said objects or timing of displacements.

The diagram of FIG. 1 shows a collimator consisting of a cylinder 2 which comprises two windows 4 and 6 and is fitted internally with diaphragms constituted by elements such as the element 8, said diaphragms being formed of blackened metal, for example, and inserted into the cylinder in adjacent relation. The sun-masking device 10 prevents the light rays from impinging upon the window in directions other than the direction of observation and from being diffused by the window glass so as to produce unwanted illumination of the photodetector 12. It is readily apparent that the photodetector can be placed either within the interior of the cylinder in front of the window or after the window as shown in the figure. The wire 14 connects the photoreceiver to the electronic circuit for the measurement of light intensity. The unit containing the electronic measuring circuit can be screwed onto the frame 16 which is attached to the cylinder of the collimator 2. In an alternative embodiment of the invention which is not illustrated in the figure, the window 6 has convex opposite surfaces and constitutes a lens which forms an image of the object whose passage is to be detected on the surface of the photodetector.

There is shown in FIG. 2 the collimator on a mounting support 18 associated with the sighting lens 20 which is fixed on the cylinder 2 of the collimator by means of two fastening-collars 24 and 26. The photodetector 12 is shown at the exit of the collimator.

FIG. 3 is a block diagram of the electronic measuring circuit with the photoreceiver which consists of a phototransistor 12 in this case and the electronic output signal of which is amplified at 28 in a preamplifier, then differentiated with respect to time in the unit 30. The signal delivered from the unit 30 undergoes a polarity discrimination within the unit 32 which is followed by an impedance matching system at 34, then at the output by an amplitude discriminator as shown at 36.

FIG. 4 is an electronic diagram of construction of an electronic circuit in accordance with the invention, the unit 28 being the preamplifier comprises a transistor; the differentiating unit 30 is constituted solely by a capacitor 60 in series; and the unit 32 is the discriminating circuit. The polarity-discriminating unit 32 comprises a shaping element associated with a photodiode 39 with a monostable device. Finally, the unit 34 is formed of an emitter-follower transistor and delivers the output signal at 70. The signal delivered at 70 corresponding to the passage of an object is a potential peak.

An amplitude discrimination element (not shown in the figure) can be connected in series after the output 70 in order to determine the speed of the object or to count only those objects which come within a range of predetermined speeds. Likewise a counting element not shown in the figure but of known type is capable of counting the number of peaks. This number is proportional to the number of objects which occult the collimator. The resistor 40 has a value of 10 kilohms, the capacitor 60 has a value of 0.1 microfarad, the resistor 42 has a value of 22 kilohms, the resistor 41 is a variable resistor, the capacitor 61 has a value of 100 microfarads, the resistor 44 has a value of 150 ohms, the resistor 43 has a value of 15 kilohms, the resistor 45 has a value of 1500 ohms, the capacitor 63 has a value of 10 microfarads, the resistor 46 has a value of 5.8 kilohms, the capacitor 62 has a value of 10 microfarads, the resistor 47 has a value of 47 kilohms, the resistor 48 has a value of 15 kilohms, the resistor 51 has a value of 15 kilohms, the resistor 52 has a value of 5.6 kilohms, the resistor 53 has a value of 22 kilohms, the resistor 54 has a value of 5.6 kilohms, the capacitor 64 has a value of 10 microfarads, the resistor 50 has a value of 1 kilohm and the resistor 55 has a value of 1 kilohm.

Apart from the photoconducting transistor, the transistors employed are of type 2N 2484 whereas the photoconducting input transistor 12 is of type ESM S3.

The invention is particularly suited to the detection and timing of the passage of skiers across a finishing line, to the counting of vehicles on a road or to a measurement of delivery of products at the end of a production line.

We claim:

1. A method for detecting the passage of objects, wherein said method comprises the steps of: causing said objects to pass in front of a background whose brightness is distinctly different from that of the objects, aligning a collimator in a direction of observation such that the path of the objects intersects a line defining the direction of observation of the collimator, eliminating the light which comes from directions other than the direction of observation, detecting the variation of light intensity corresponding to the passage of the object by means of an electrical signal which is delivered by a photoreceiver and is a function of the luminous flux picked up by said photoreceiver, and differentiating said electrical signal with respect to time by means of an electronic differentiating circuit so that there is consequently obtained an output signal which is a function of the variations of said luminous flux on said photoreceiver.

2. A method according to claim 1, further comprising the step of detecting the polarity of the output signal obtained from the electronic differentiating circuit.

3. A method according to claim 1, further comprising the step of detecting only those output signals obtained from the electronic differentiating circuit which are within a preselected amplitude range.

4. A method according to claim 1, further comprising the step of focusing the light from the collimator on the photoreceiver.

5. A device for detecting the passage of objects comprising:
   a collimator formed of a cylindrical tube which is closed at each end by a transparent window;
   a plurality of absorbent shields disposed within the interior of the collimator so as to form a baffle-plate system;
   a photoreceiver located at the exit end of the collimator; and
   electronic means connected to said photoreceiver for differentiating, amplifying and discriminating the electrical signal at the output of the receiver according to polarity to obtain an ouput signal which is a function of the variations of the luminous flux on said photoreceiver.

6. A device according to claim 5, wherein said device further comprises a sighting telescope parallel to the axis of the cylinder.

7. A device according to claim 5, wherein said device further comprises a sun shield attached to the entrance end of the collimator.

8. A device according to claim 5, wherein the photoreceiver is selected from the group consisting of phototransistors, photodiodes, photomultipliers and light-intensifying tubes.

9. A device according to claim 5, wherein said device further comprises a lens between the exit of the collimator and the photoreceiver.

10. A device according to claim 5, wherein the diaphragms are formed of metal on which a mat black coating has been deposited.

11. A device according to claim 5, wherein the electronic chain further comprises a counting element for delivering a signal which is proportional to the number of objects detected.

12. A device according to claim 5, wherein the electronic means for differentiating, amplifying and discriminating the signal comprises a preamplifier, a differentiating circuit, a polarity-discriminating circuit and an impedance matching circuit, these different elements being disposed in the order aforesaid and in series.

13. A device according to claim 10, wherein said device further comprises an amplitude discriminator placed at the output of the electronic circuit.

* * * * *